Feb. 23, 1960

F. RICHELLI 2,925,721

MACHINE FOR THE AUTOMATIC MANUFACTURING AND EXTRACTING
OF BLOCKS, EITHER OPAQUE OR CRYSTALLINE ICE
Filed Dec. 7, 1955

United States Patent Office 2,925,721
Patented Feb. 23, 1960

2,925,721

MACHINE FOR THE AUTOMATIC MANUFACTURING AND EXTRACTING OF BLOCKS, EITHER OPAQUE OR CRYSTALLINE ICE

Federico Richelli, Milan, Italy

Application December 7, 1955, Serial No. 551,690

Claims priority, application Italy October 22, 1955

2 Claims. (Cl. 62—132)

The present invention relates to machines for the automatic manufacturing and extraction of blocks of ice.

As is well known, conventional methods for the manufacture of ice blocks consisted of quenching molds filled with the water to be frozen in a brine bath maintained at low temperature.

A second type of method for the manufacture of ice blocks employs double-walled molds, in whose jackets a refrigerating fluid is made to circulate. Said molds have their upper extremities open while their bottoms are closed and the molds are externally insulated and kept in a vertical position by supports. Alternatively, said molds can have both ends open and are plunged into a water container.

As will be realized, the first described method is somewhat primitive and inefficient for the modern industrial manufacture of ice blocks. The second mentioned method presents the inconvenience that the filling of the molds with water takes considerable time with substantial loss of heat because, before their filling, each mold has to be made water-tight and this is obtained by freezing in place an initial thin layer of water after which the molds can be filled. The loss of heat is severe, because it is necessary to bring down to freezing temperature not only the water, but as well the heavy casing of the molds.

Plunging open-ended molds into a tank filled with water represents another drawback inasmuch as such a mold will be hard to insulate. Furthermore, there is the inconvenience of having to prevent ice-formation outside of the freezing zone in the molds and, consequently, the resulting inconvenience of having to detach the formed block during the thawing period.

Taking into due account and consideration all of the above-mentioned inconveniences and drawbacks, the invention provides a machine for the automatic manufacture and extraction of ice blocks, which would present at least the following advantages: substantial reduction of the thermal masses involved both in the molds and in the circulating refrigerant fluid, shorter periods of freezing, easy extraction of ice blocks from the molds, and simplified rapid refilling of the molds once a block has been extracted; and, finally, simplification of the machine itself.

The above-mentioned objects, advantages and improvements have been obtained with a machine for the manufacture of ice-blocks which comprises a vessel or tank suitable to enclose a given amount of water to be frozen, which is suitably kept at a certain constant level in the vessel; and a plurality of freezing molds fastened by their respective mouths to the vessel's bottom, said molds being provided with double-walled sides into which a thermal transfer fluid is circulated, i.e., alternatively freezing and thawing.

The bottom of said molds and the zone toward the mouths are provided with double-walled sides, in which water is caused to circulate to attain two advantages: to prevent ice-blocks from sticking to the bottoms and ice from protruding from the mouths; and to cause the pre-cooling of the water entering the vessel when a block of ice is extracted from it.

When the ice-block is formed, the machine cycle is reversed and a warmer medium is circulated in the double-walled sides; defrosting thus takes place and this causes the detachment of the block from the mold. Owing to the contemporaneous ingress of water, the block is floated.

A more detailed description is given below, and illustrated in the accompanying drawing in which:

Fig. 1 is a diagrammatic elevation and longitudinal sectional view of an ice-block manufacturing machine according to the present invention, provided with four molds, two of which are shown sectioned;

Fig. 2 is a diagrammatic top view of the machine of Fig. 1;

Figs. 3 and 4 are two variants of the molds, according to which said molds are provided with internally directed vanes; and Fig. 5 is an enlarged view of two of the molds of Fig. 1.

Referring to the attached drawing, the illustrated machine comprises a vessel 1, thermally insulated by a jacket 1a. Preferably, this vessel is provided with vertical end-walls 2, a cover 3, and with another wall 4 which slopes in two sections 4a and 4b.

The bottom 5 of the vessel is provided with a number of molds 6 in which the ice blocks are formed. Each mold has a solid bottom 7 which is integral with its four side walls 8.

On the bottom 5 of the vessel 1 provided with openings 5', the upper extremities or mouths 6' of the molds or the freezing chambers 6 are fastened.

Said chambers are lock fitted with a double-walled structure or jacket 8a to form a surrounding perimetral cavity where a refrigerating or thermal transfer fluid is made to circulate, as well as with a hollow bottom 7 and with a hollow ring 7' adjacent the bottom 5.

Into cavities 7 and 7' is supplied water from a feeding mechanism 15 regulated by a constant level governor 15a, the water traveling through a pipe 16; said cavities are serially connected to each other, and also to the vessel 1 through pipes or tubes 16, 17, 18, 19 and 20 whereby the water is made to circulate.

This circulation, being of supply water that is relatively warm, prevents ice, being formed in the molds, from sticking to the bottoms 7, and by the means of rings 7' prevents the formation of ice above mouths 5'. Further, this circulation obtains a pre-cooling of the water.

The refrigerating fluid is made to circulate in the cavity 8a of each mold 6, and this causes ice to form on the walls 8. The molds thus fill up and ice blocks are formed.

When ice has filled the molds, the reversing of the flow of the refrigerating fluid causes the cavities 8a surrounding the mold to be filled with a warmer fluid which is actually the same fluid coming from the compression phase of the refrigerating cycle; this causes a slight superficial defrosting action in the mold and the detaching of the ice blocks from the walls 8 of each mold. Each jacket 8a is connected by means of pipes 10 and 11, to an automatic distributor, which regulates the freezing and defrosting cycles at suitable time intervals to achieve a production of ice blocks regularly and promptly. The distributor 9 is connected to a conventional refrigerating unit diagrammatically represented at 9a.

When transparent ice is desired, the water sent in the mold 6 is stirred during the freezing period by any known means; i.e., means blowing air through the water by nozzles 12 set on the bottom 7 of each mold.

The arrangement of molds 6 on the bottom 5 of vessel 1, according to this invention, allows the extraction of the ice blocks from the molds as soon as the defrosting of walls 8 has caused a detachment of the blocks.

Owing to the difference in the density of ice and water, the ice will float to the top of the water and come to the surface 13. As soon as a block of ice is extracted from the vessel 1, an equal amount of water is caused to flow in to substitute for the volume lost in the formation of the ice block; this is controlled by the device 15 and a float controlled device 15a regulating the flow through pipes 16 and 17, bottom 7, pipe 18, rings 7' and pipe 20; pipe 20 discharges into the vessel 1 and the water, during passage through elements 7 and 7', is pre-cooled.

The ice blocks (not shown) floating on the surface 13 of body of water 14, are transferred by a suitable conveyor 21 which consists of an endless chain 22 to which vanes 23 are fastened, the chain being set in motion by action of a pinion 24 in the direction of arrow A so that vanes 23 come in contact with the floating ice blocks and push them onto the inclined part 4a of vessel 1. The blocks are extracted through an opening in the adjoining end wall 2.

In order to speed up the formation of ice blocks in the molds, a number of vanes can be directed inwardly in the molds (see Figs. 3 and 4) to penetrate within the ice blocks. These vanes are freezing plates and can be double-walled plates of the same structure employed for the walls of the molds.

By using a machine of the present invention, there will be attained: minimum dispersion of heat during the reversing of the refrigerating cycle owing to the small thermal masses thus insuring rapid defrosting action; and the recovery of heat in the feeding of the water which is pre-cooled when it is sent to warm elements 7 and 7' of the cells or molds.

The invention also provides an instantaneous refilling of the molds with water from vessel 1, which water enters molds 6 as soon as the ice blocks are freed from the molds, this refilling being obtained with pre-cooled water which allows a considerable increase in the production of ice blocks.

Only one embodiment of the invention has been described as an example and it is apparent that many other modifications can be employed without departing from the scope of the invention.

What is claimed is:

1. A machine for the production of ice blocks comprising a tank for holding a constant amount of water to be frozen, means for keeping the water at a constant specific level in the tank, a plurality of freezing molds depending from and secured to the bottom of the tank and opening into the latter, said molds including jackets defining chambers in which can circulate a thermal transfer fluid, conduits on the upper and lower extremities of said molds and in which water is circulated to avoid the adherence of ice to these extremities and to pre-cool water which enters into the tank, the conduits being coupled serially between said means and said tank and means coupled to the chambers to control the temperature of said fluid in the jackets by inverting a refrigerating cycle whereby the separation of ice adhering to the molds is achieved so that in response to the entrance of water from the tank into said molds ice blocks detach themselves and float to the surface of the water in the tank.

2. A machine according to claim 1 wherein the first said means includes a container separate from the tank, and a tube connecting the container with said conduits to keep the extremities of the molds relatively warm and to pre-chill the water supplied to the tank.

References Cited in the file of this patent

UNITED STATES PATENTS

| | | |
|---|---|---|
| 1,540,632 | Kelly | June 2, 1925 |
| 1,963,842 | Gay | June 19, 1934 |
| 2,080,639 | Taylor | May 18, 1937 |
| 2,133,521 | Wussow | Oct. 18, 1938 |
| 2,149,000 | Udell | Feb. 28, 1939 |
| 2,221,212 | Wussow | Nov. 12, 1940 |
| 2,571,506 | Watt | Oct. 16, 1951 |
| 2,639,594 | Watt | May 26, 1953 |